July 28, 1936.  R. R. ROBERTSON  2,049,137
LOAD TRANSMISSION CENTER JOINT
Filed Oct. 12, 1934  2 Sheets-Sheet 1
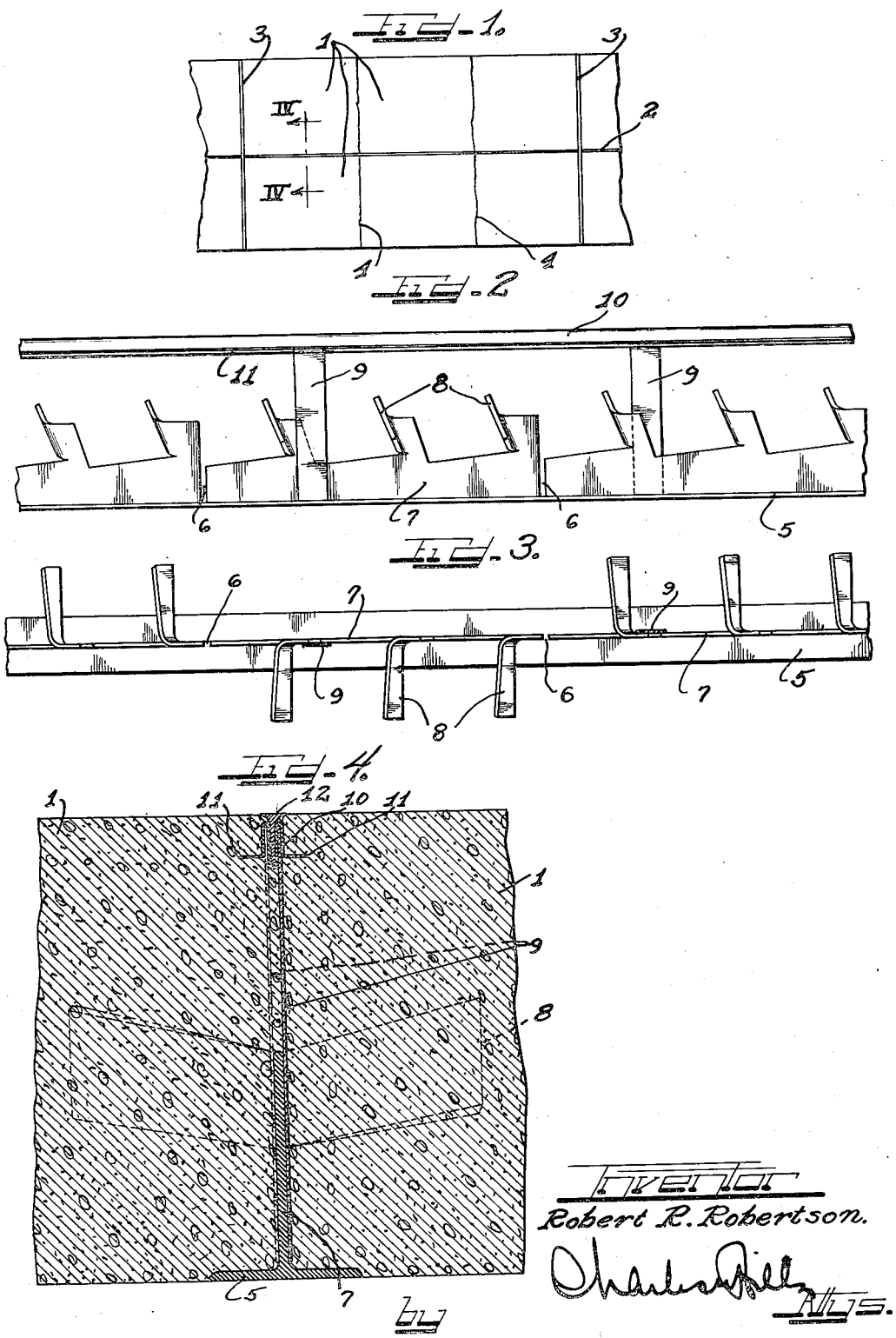
Inventor
Robert R. Robertson.

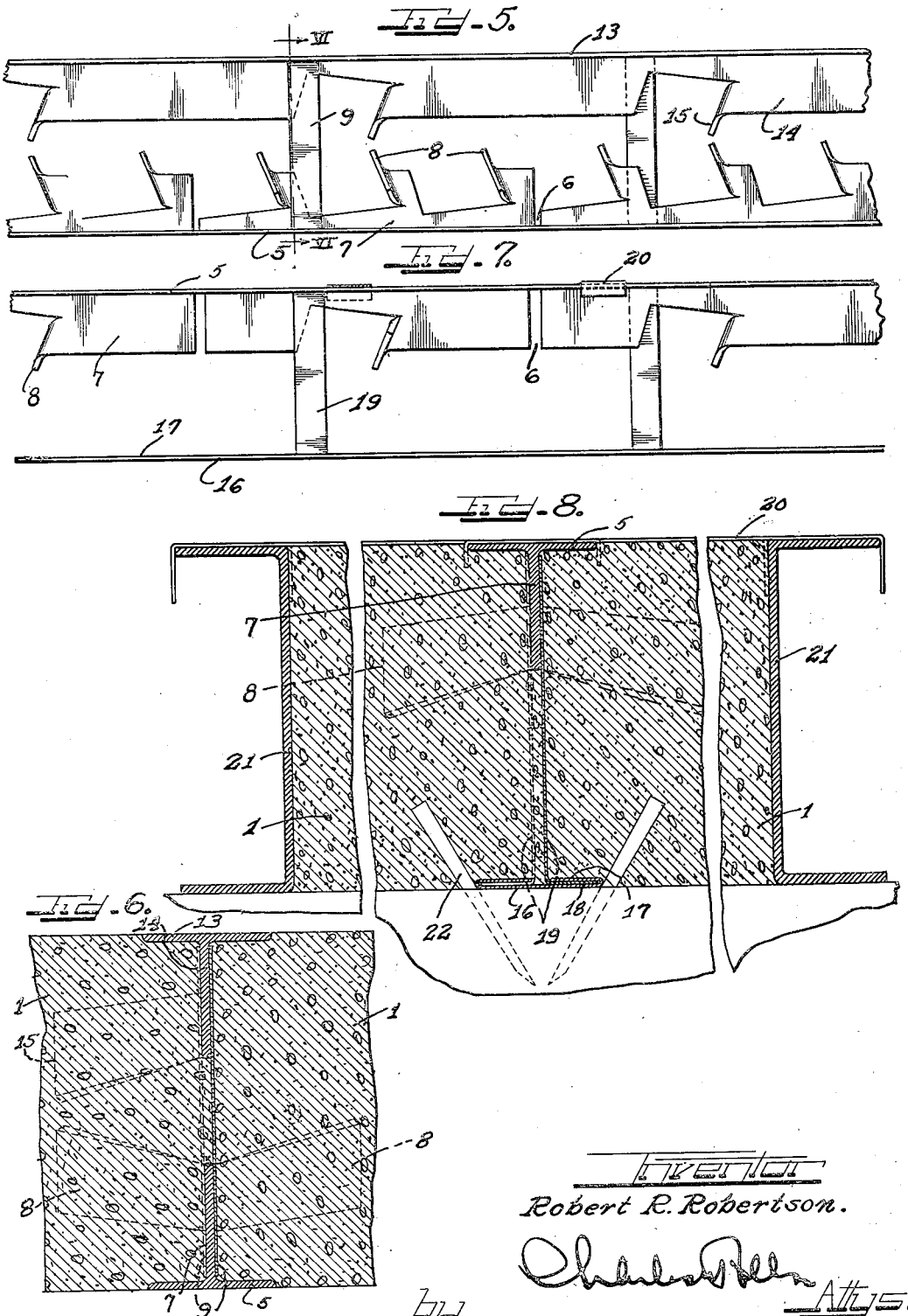

Patented July 28, 1936

2,049,137

UNITED STATES PATENT OFFICE 2,049,137

LOAD TRANSMISSION CENTER JOINT

Robert R. Robertson, Chicago, Ill., assignor to The Translode Joint Company, Chicago, Ill., a corporation of Illinois Application October 12, 1934, Serial No. 748,040

14 Claims. (Cl. 94—17)

This invention relates to a concrete road center joint including an improved load transmitting and sealing base having supports secured thereto on which sealing caps are supported for carrying removable edging bars, which when removed provide suitable center grooves for the reception of a bituminous filling.

It is an object of this invention to provide a center joint crack producing mechanism including a base unit comprising a sealing base plate and an upright web which is divided into a plurality of sections, each of which has formed thereon anchoring members, with the anchoring members of adjacent sections staggered with respect to one another for the purpose of securely connecting the concrete slabs on opposite sides of the center joint.

It is also an object of this invention to provide a center joint cracking unit including an upper joint sealing means which is held in position by supports forming a part of a supporting base which also serves as a seal for the bottom of the center joint crack.

It is a further object of this invention to provide a center joint constructed to rigidly secure together the concrete slabs on opposite sides of the center joint to prevent the slabs from moving upwardly out of position.

It is furthermore an object of this invention to provide a center joint forming mechanism including a base plate having an integral web which is divided into sections formed with anchoring members, with the anchoring members of adjacent sections staggered with respect to one another for the purpose of binding together the concrete slabs on opposite sides of the center joint.

It is an important object of this invention to provide a load transmission center joint for a concrete construction, said center joint including a base having load transmission members formed thereon and constructed to permit adjacent sections to be anchored in opposite concrete slabs to prevent opposite slabs from moving away from one another or from moving upwardly out of their proper planes.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary top plan view of a concrete road having a load transmission center joint embedded longitudinally in the road and intercepted at spaced intervals by road expansion joints and contraction joints dividing the road into concrete slabs or sections.

Figure 2 is a fragmentary vertical side view of a load transmission center joint embodying the principles of this invention.

Figure 3 is a fragmentary top plan view of the base portion of the center joint with the sealing cap removed.

Figure 4 is a fragmentary enlarged vertical detail section taken on line IV—IV of Figure 1 illustrating the center joint mechanism embedded in concrete and also showing the edging bar in place.

Figure 5 is a fragmentary side view of a modified form of a load transmission center joint forming mechanism including a modified form of top sealer.

Figure 6 is an enlarged fragmentary vertical detail section taken on line VI—VI of Figure 5 showing the joint mechanism embedded in concrete.

Figure 7 is a fragmentary side view of another modified form of a center joint forming mechanism including a modified form of a joint sealing base.

Figure 8 is a fragmentary transverse vertical detail section of the joint illustrated in Figure 7 showing the embedded joint staked in position and engaged by temporary holders.

As shown on the drawings:

The upper or crown portion of a road which is supported on the road subgrade is illustrated in Figure 1 and comprises a plurality of concrete sections or slabs 1 which are formed by means of a longitudinal center joint indicated as a whole by the reference numeral 2 and by means of transverse expansion joints 3 and contraction joints 4. The contraction joints 4 are located at spaced intervals between the expansion joints 3 as indicated in Figure 1.

The improved load transmission center joint comprises a base member in the form of a T-bar consisting of a bottom or base plate 5 and an upwardly projecting flange or web, which at spaced intervals is provided with cuts or slots 6 which extend downwardly from the top edge of the web to the base plate 5. The vertical slots 6 divide the web into a plurality of plates or web sections 7. Each of the web sections 7 has struck outwardly from the upper margin thereof a plurality of anchoring blades or lugs 8 leaving the inner side of the upright plate or web construction flat. As clearly illustrated in Figure 3 the anchoring blades or lugs 8 of adjacent web sections project in opposite directions so that the anchoring blades of the base unit are staggered with respect to one another.

Rigidly secured by brazing or other suitable means, to each of the plates or web sections 7 is the lower end of a supporting bar or post 9. The supporting bars 9 as illustrated in Figure 3, are secured on the sides of the web plates 7 from which the anchoring blades project. Supported upon the upper ends of the bars or posts 9 is a grooved sealing cap 10 formed with an upwardly opening middle channel or groove and with two downwardly opening side grooves into which the upper ends of the supporting bars 9 project as clearly shown in Figure 4 to hold the sealing cap in place. The sealing cap is provided with outwardly projecting anchoring flanges 11. Removably seated in the middle groove of the sealing cap is an edging bar 12 which projects upwardly above the top of the sealing cap and is formed with curved side surfaces for the purpose of properly rounding the upper edges of the center joint groove.

With the center joint forming mechanism in position as illustrated in Figure 2, concrete is poured on opposite sides of the joint forming mechanism to form the concrete road slabs or sections 1. After the concrete on opposite sides of the road forming mechanism has cured sufficiently, the edging bar 12 is removed leaving a center joint groove. The center groove is filled with bitumen or the like.

Attention is called to the fact that when the concrete is poured on opposite sides of the joint forming mechanism that the anchoring blades or lugs 8 of adjacent web sections 7 are anchored in the concrete sections on opposite sides of the center joint so that the pair of concrete slabs 1 on opposite sides of the center joint and between two of the transverse joints of the road, are connected together to prevent the road slabs on opposite sides of the center joint from moving upwardly, with respect to one another to disrupt the top surface of the road.

The center joint sealer 10 is so constructed that it cannot pull loose from the concrete. When contraction takes place, the concrete is cracked longitudinally of the road in substantially a straight line defined by the web plates 7 and the posts 9. Contraction also causes the sealing cap to be drawn out, while the anchor plate sections 7, of the base unit, are deflected or bent outwardly in the direction of movement of the respective slabs in which the anchor blades 8 of the respective web sections are embedded. When expansion of the road slabs takes place, the joint sealer is forced back into normal position and the web sections 7 are also deflected back into place. With the concrete slabs 1 on opposite sides of the center joint connected together by means of the load transmission anchoring blades 8, loads applied to the road slabs are transmitted from one slab to an opposite slab.

Figures 5 and 6 illustrate a modified form of center joint forming mechanism in which the load transmission base unit and the supporting posts are the same as those illustrated in Figures 1 to 4 inclusive. Like parts are designated by corresponding reference numerals.

Supported upon the upper ends of the supporting bars or posts 9 is an upper joint sealer or cap comprising a T-bar consisting of a top plate 13 and a depending flange or web 14. The top plate 13 serves as a center joint marking strip and a sealer for the top of the center joint crack. The depending flange or web 14 of the T-bar is cut and has portions of the web deflected outwardly on one side only of the web to provide anchoring blades or lugs 15. The lugs 15 serve to hold the top sealer bar anchored in position against removal. The web sections 7 and the depending web 14 serve to cause the concrete to crack in substantially the planes of said web sections and web.

The base plate 5 acts as a sealer for the bottom of the center joint crack. The top of the center joint crack is closed by means of the top plate 13 of the top sealer.

Figures 7 and 8 illustrate another modified form of center joint forming mechanism. In this form of the device, a sealer base is provided resting on the subgrade and comprising a base plate 16 having the side margins bent upwardly and inwardly to form side channels 17. Seated upon the base plate 16 and projecting into the channels 17 are the feet or supporting flanges 18 of supporting bars or posts 19. The bars 19 are staggered with respect to one another.

Supported upon the upper ends of the bars 19 is a load transmission top joint sealer or cap constructed substantially the same as the base unit illustrated in Figures 2, 3 and 4.

For the purpose of holding the center joint forming mechanism in place prior to the pouring of concrete, channel bars 20 are alternately hooked over the opposite edges of the top sealing plate 5 and over the top flanges of the road side forms 21 as clearly illustrated in Figure 8. The sealer base of the center joint device is held in place along the center of the road subgrade by means of stakes 22 which are driven into the subgrade on opposite sides of the base.

After the concrete has been poured and has been properly cured, the channel bars 20 and the side forms 21 are removed. The center joint forming mechanism causes the concrete to crack longitudinally along the center line of the road. The center joint crack is defined by means of the depending web 7 and the supporting bars 19, and said crack is sealed at the bottom by the base 16 and at the top by the sealing plate 5.

It will of course, be understood that various details of construction may be varied through a wide range without departing from the principles of this invention, and it is therefore not the purpose to limit the patent granted hereon otherwise than necessitated by the scope of the appanded claims.

I claim as my invention:

1. A load transmission center joint mechanism comprising a base plate, a plurality of web sections integrally formed on the base plate, anchoring members formed on said web sections, with the anchoring members of adjacent sections projecting outwardly in opposite directions to provide a staggered arrangement of the anchoring members, supports secured to the web sections and a sealing cap engaged on said supports.

2. A load transmission center joint mechanism comprising a base plate, a plurality of web sections integrally formed on the base plate, anchoring members formed on said web sections, with the anchoring members of adjacent sections projecting outwardly in opposite directions to provide a staggered arrangement of the anchoring members, supports secured to the web sections, a sealing cap engaged on said supports, and an edging bar removably supported in the sealing cap.

3. A road center joint forming mechanism comprising a base plate, a plurality of web sections integrally formed on the base plate and spaced from one another, anchoring staggered members integrally formed on the web sections arranged to be embedded in opposite slabs of a concrete construction for transmitting loads from one slab to another, a joint sealing cap, and means for supporting the same on the web sections.

4. A road center joint forming mechanism comprising a base having a plurality of longitudinally spaced members formed thereon, anchoring means formed on said members with the anchoring means of adjacent members projecting in opposite directions, a sealing cap for the center joint, and supporting means on said spaced members for holding the sealing cap in position.

5. A load transmission center joint mechanism including in combination a load transmission unit comprising a T-cross-sectioned member having the web thereof slotted to divide the web into a plurality of sections, and anchoring means on said sections with the anchoring means of adjacent sections staggered with respect to one another.

6. A load transmission center joint mechanism including in combination a load transmission unit comprising a plate having a web integrally formed thereon, said web having a plurality of slots therein for dividing the web into a plurality of sections, and anchoring means struck outwardly from said sections and arranged in staggered relation.

7. A load transmission center joint mechanism including in combination a load transmission T-bar including a base and a plate member, a plurality of spaced anchoring means formed on said plate member with adjacent anchoring means staggered to be anchored in opposite concrete sections of a road.

8. A load transmission center joint forming mechanism including in combination a load transmission unit comprising a plate member, a slotted web formed thereon, and anchoring means formed on said slotted web and arranged in staggered relation for connecting the concrete road slabs on opposite sides of the center joint.

9. A road center joint forming mechanism comprising a joint sealing member including a slotted portion on which anchoring means are formed in staggered relation, supports engaged with said slotted portions, and a joint sealing means engaged with said supports.

10. A road center joint forming mechanism comprising a joint sealing base, a plurality of spaced supporting members alternately arranged on opposite sides of said base, and a joint top sealer supported on said members and projecting downwardly therebetween.

11. A center joint former comprising a sealing base, means for holding the same in position, staggered supports on said base, a top sealer thereon, and staggered anchoring means on said top sealer embedded in the concrete on opposite sides of the center joint former.

12. A center joint former comprising a load transmission base unit, including a slotted member having staggered anchoring means thereon, supports on the base unit, a T-bar on said supports including a depending web projecting between the supports, and anchoring means projecting from one side of said web to hold the T-bar from being lifted out of the concrete in which the center joint former is embedded.

13. A center joint former comprising a pair of T-bars positioned one above the other with the webs thereof projecting toward one another, means for connecting the T-bars, load transmitting means on one of said T-bars and projecting in opposite directions therefrom, and anchoring means projecting from one side of the other of said T-bars.

14. A load transmission center joint comprising a sealing means, supports connected therewith, and a load transmission unit connected with said supports and comprising a plate having a flange formed thereon, said flange having a plurality of slots therein dividing the plate into sections, and anchoring means on said sections with the anchoring means of adjacent sections arranged in staggered relation for transmitting loads through said plate from concrete slabs on opposite sides of the center joint.

ROBERT R. ROBERTSON.